(12) United States Patent
Laurent et al.

(10) Patent No.: US 9,242,372 B2
(45) Date of Patent: Jan. 26, 2016

(54) ADAPTIVE ROBOTIC INTERFACE APPARATUS AND METHODS

(71) Applicant: BRAIN CORPORATION, San Diego, CA (US)

(72) Inventors: Patryk Laurent, San Diego, CA (US); Jean-Baptiste Passot, La Jolla, CA (US); Mark Wildie, San Diego, CA (US); Eugene M. Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 13/907,734

(22) Filed: May 31, 2013

(65) Prior Publication Data

US 2014/0358284 A1  Dec. 4, 2014

(51) Int. Cl.
*B25J 9/16* (2006.01)
*G05B 19/409* (2006.01)
*G06N 3/04* (2006.01)

(52) U.S. Cl.
CPC .............. *B25J 9/161* (2013.01); *G05B 19/409* (2013.01); *G05B 2219/36136* (2013.01); *G05B 2219/36137* (2013.01); *G06N 3/049* (2013.01); *Y10S 901/02* (2013.01)

(58) Field of Classification Search
CPC ............ B25J 9/16–9/1605; B25J 9/161; B25J 9/1612; B25J 9/1671; B25J 13/00; B25J 13/006; B25J 13/08–13/081; B25J 9/1697; B25J 9/1689; Y10S 901/02–901/03; Y10S 715/961; Y10S 715/965–715/967; Y10S 715/97; Y10S 715/974; A61B 19/22; A61B 19/2203; A61B 2019/2223; G05B 19/4147; G05B 2219/40099; G05B 2219/40414; G05B 19/425; G05B 19/401–19/404; G05B 19/427; G05B 2219/36159; G05B 19/414; G05B 2219/13144; G05B 2219/23258; G05B 2219/32128; G05B 2219/34291; G05B 2219/35488; G06F 3/0416; G06F 15/0225
See application file for complete search history.

(56) References Cited

U.S. PATENT DOCUMENTS

| 4,468,617 A | 8/1984 | Ringwall |
| 4,763,276 A | 8/1988 | Perreirra et al. |

(Continued)

FOREIGN PATENT DOCUMENTS

| CN | 102226740 | 10/2011 |
| JP | 4087423 | 3/1992 |

(Continued)

OTHER PUBLICATIONS

Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.

(Continued)

*Primary Examiner* — Bao Long T Nguyen
(74) *Attorney, Agent, or Firm* — Gazdzinski & Associates, PC

(57) ABSTRACT

Apparatus and methods for training of robotic devices. A robot may be trained by a user guiding the robot along target trajectory using a control signal. A robot may comprise an adaptive controller. The controller may be configured to generate control commands based on the user guidance, sensory input and a performance measure. A user may interface to the robot via an adaptively configured remote controller. The remote controller may comprise a mobile device, configured by the user in accordance with phenotype and/or operational configuration of the robot. The remote controller may detect changes in the robot phenotype and/or operational configuration. User interface of the remote controller may be reconfigured based on the detected phenotype and/or operational changes.

26 Claims, 9 Drawing Sheets

(56) References Cited

U.S. PATENT DOCUMENTS

| | | |
|---|---|---|
| 4,852,018 A | 7/1989 | Grossberg |
| 5,063,603 A | 11/1991 | Burt |
| 5,092,343 A | 3/1992 | Spitzer |
| 5,245,672 A | 9/1993 | Wilson |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,638,359 A | 6/1997 | Peltola |
| 5,673,367 A | 9/1997 | Buckley |
| 5,719,480 A | 2/1998 | Bock |
| 5,739,811 A | 4/1998 | Rosenberg et al. |
| 5,841,959 A * | 11/1998 | Guiremand ............... 345/440 |
| 5,875,108 A | 2/1999 | Hoffberg |
| 6,009,418 A | 12/1999 | Cooper |
| 6,014,653 A | 1/2000 | Thaler |
| 6,363,369 B1 | 3/2002 | Liaw |
| 6,366,293 B1 * | 4/2002 | Hamilton et al. ........... 345/649 |
| 6,442,451 B1 * | 8/2002 | Lapham ................. 700/245 |
| 6,458,157 B1 | 10/2002 | Suaning |
| 6,489,741 B1 | 12/2002 | Genov |
| 6,545,705 B1 | 4/2003 | Sigel |
| 6,545,708 B1 | 4/2003 | Tamayama et al. |
| 6,546,291 B2 | 4/2003 | Merfeld |
| 6,581,046 B1 | 6/2003 | Ahissar |
| 6,636,781 B1 | 10/2003 | Shen |
| 6,643,627 B2 | 11/2003 | Liaw |
| 6,697,711 B2 | 2/2004 | Yokono |
| 6,961,060 B1 | 11/2005 | Mochizuki et al. |
| 7,002,585 B1 * | 2/2006 | Watanabe et al. .......... 345/475 |
| 7,024,276 B2 | 4/2006 | Ito |
| 7,324,870 B2 | 1/2008 | Lee |
| 7,342,589 B2 * | 3/2008 | Miserocchi ................ 345/536 |
| 7,395,251 B2 | 7/2008 | Linsker |
| 7,426,501 B2 | 9/2008 | Nugent |
| 7,426,920 B1 | 9/2008 | Nugent |
| 7,668,605 B2 * | 2/2010 | Braun et al. .................. 700/17 |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,315,305 B2 | 11/2012 | Petre |
| 8,419,804 B2 | 4/2013 | Herr et al. |
| 8,452,448 B2 | 5/2013 | Pack et al. |
| 8,467,623 B2 | 6/2013 | Izhikevich |
| 8,639,644 B1 | 1/2014 | Hickman et al. |
| 8,751,042 B2 | 6/2014 | Lee |
| 8,793,205 B1 | 7/2014 | Fisher |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,070,039 B2 | 6/2015 | Richert |
| 2002/0038294 A1 | 3/2002 | Matsugu |
| 2002/0158599 A1 | 10/2002 | Fujita et al. |
| 2002/0169733 A1 | 11/2002 | Peters |
| 2002/0198854 A1 | 12/2002 | Berenji et al. |
| 2003/0023347 A1 | 1/2003 | Konno |
| 2003/0050903 A1 | 3/2003 | Liaw |
| 2003/0144764 A1 | 7/2003 | Yokono et al. |
| 2004/0036437 A1 | 2/2004 | Ito |
| 2004/0051493 A1 | 3/2004 | Furuta |
| 2004/0136439 A1 | 7/2004 | Dewberry |
| 2004/0193670 A1 | 9/2004 | Langan |
| 2005/0004710 A1 | 1/2005 | Shimomura |
| 2005/0015351 A1 | 1/2005 | Nugent |
| 2005/0036649 A1 | 2/2005 | Yokono |
| 2005/0065651 A1 | 3/2005 | Ayers |
| 2005/0069207 A1 | 3/2005 | Zakrzewski et al. |
| 2005/0283450 A1 | 12/2005 | Matsugu |
| 2006/0094001 A1 | 5/2006 | Torre |
| 2006/0161218 A1 | 7/2006 | Danilov |
| 2006/0181236 A1 | 8/2006 | Brogardh |
| 2006/0207419 A1 | 9/2006 | Okazaki et al. |
| 2007/0022068 A1 | 1/2007 | Linsker |
| 2007/0176643 A1 | 8/2007 | Nugent |
| 2007/0208678 A1 | 9/2007 | Matsugu |
| 2007/0260356 A1 | 11/2007 | Kock |
| 2008/0040040 A1 | 2/2008 | Goto et al. |
| 2008/0097644 A1 | 4/2008 | Kaznov |
| 2008/0100482 A1 | 5/2008 | Lazar |
| 2008/0112596 A1 | 5/2008 | Rhoads et al. |
| 2008/0133052 A1 | 6/2008 | Jones |
| 2008/0154428 A1 | 6/2008 | Nagatsuka |
| 2008/0319929 A1 | 12/2008 | Kaplan et al. |
| 2009/0037033 A1 | 2/2009 | Phillips et al. |
| 2009/0043722 A1 | 2/2009 | Nugent |
| 2009/0234501 A1 | 9/2009 | Ishizaki |
| 2009/0287624 A1 | 11/2009 | Rouat |
| 2010/0036457 A1 | 2/2010 | Sarpeshkar |
| 2010/0081958 A1 | 4/2010 | She |
| 2010/0086171 A1 | 4/2010 | Lapstun |
| 2010/0166320 A1 | 7/2010 | Paquier |
| 2010/0169098 A1 | 7/2010 | Patch |
| 2010/0222924 A1 | 9/2010 | Gienger |
| 2010/0225824 A1 | 9/2010 | Lazar |
| 2010/0286824 A1 | 11/2010 | Solomon |
| 2010/0299101 A1 | 11/2010 | Shimada |
| 2010/0312730 A1 | 12/2010 | Weng et al. |
| 2011/0016071 A1 | 1/2011 | Guillen |
| 2011/0026770 A1 | 2/2011 | Brookshire |
| 2011/0035052 A1 | 2/2011 | McLurkin |
| 2011/0060461 A1 | 3/2011 | Velliste et al. |
| 2011/0067479 A1 | 3/2011 | Davis et al. |
| 2011/0119214 A1 | 5/2011 | Breitwisch |
| 2011/0119215 A1 | 5/2011 | Elmegreen |
| 2011/0144802 A1 * | 6/2011 | Jang ...................... 700/245 |
| 2011/0158476 A1 | 6/2011 | Fahn et al. |
| 2011/0160906 A1 | 6/2011 | Orita et al. |
| 2011/0196199 A1 | 8/2011 | Donhowe |
| 2011/0231016 A1 | 9/2011 | Goulding |
| 2011/0296944 A1 | 12/2011 | Carter |
| 2012/0011090 A1 | 1/2012 | Tang |
| 2012/0045068 A1 | 2/2012 | Kim et al. |
| 2012/0053728 A1 | 3/2012 | Theodorus |
| 2012/0109866 A1 | 5/2012 | Modha |
| 2012/0143495 A1 | 6/2012 | Dantu |
| 2012/0150781 A1 | 6/2012 | Arthur |
| 2012/0173021 A1 | 7/2012 | Tsusaka |
| 2012/0197439 A1 | 8/2012 | Wang |
| 2012/0209428 A1 | 8/2012 | Mizutani |
| 2012/0209432 A1 | 8/2012 | Fleischer |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0019325 A1 | 1/2013 | Deisseroth |
| 2013/0066468 A1 * | 3/2013 | Choi et al. ................. 700/258 |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 * | 4/2013 | Sanders et al. ............. 700/264 |
| 2013/0116827 A1 | 5/2013 | Inazumi |
| 2013/0151448 A1 | 6/2013 | Ponulak |
| 2013/0151449 A1 | 6/2013 | Ponulak |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297542 A1 | 11/2013 | Piekniewski |
| 2013/0310979 A1 | 11/2013 | Herr et al. |
| 2013/0325244 A1 | 12/2013 | Wang |
| 2013/0325768 A1 | 12/2013 | Sinyavskiy |
| 2013/0325773 A1 | 12/2013 | Sinyavskiy |
| 2013/0325775 A1 | 12/2013 | Sinyavskiy |
| 2013/0325776 A1 | 12/2013 | Ponulak |

(56) References Cited

U.S. PATENT DOCUMENTS

| | | |
|---|---|---|
| 2013/0325777 A1 | 12/2013 | Petre |
| 2014/0012788 A1 | 1/2014 | Piekniewski |
| 2014/0016858 A1 | 1/2014 | Richert |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen |
| 2014/0089232 A1 | 3/2014 | Buibas |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich |
| 2014/0277744 A1 | 9/2014 | Coenen |
| 2014/0358284 A1 | 12/2014 | Laurent et al. |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |

FOREIGN PATENT DOCUMENTS

| | | |
|---|---|---|
| JP | 2003175480 | 6/2003 |
| RU | 2108612 C1 | 10/1998 |
| WO | 2008083335 | 7/2008 |
| WO | 20100136961 | 12/2010 |

OTHER PUBLICATIONS

Walters, "Implementation of Self-Organizing Neural Networks for Visuo-Motor Control of an Industrial Robot", IEEE Transactions on Neural Networks, vol. 4, No. 1, Jan. 1993, pp. 86-95.

Froemke et al., "Temporal Modulation of Spike-Timing-Dependent Plasticity", Frontiers in Synaptic Neuroscience, vol. 2, article 19, Jun. 2010, pp. 1-16.

Grollman et al., 2007 "Dogged Learning for Robots" IEEE International Conference on Robotics and Automation (ICRA).

PCT International Search Report for PCT/US2014/040407 dated Oct. 17, 2014.

PCT International Search Report for International Application PCT/US2013/026738 dated Jul. 21, 2014.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_Fl.pdf>.

Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf>.

Kasabov, "Evolving Spiking Neural Networks for Spatio-and Spectro-Temporal Pattern Recognition", IEEE 6th International Conference Intelligent Systems' 2012 [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.

Lazar et al. "Consistent recovery of sensory stimuli encoded with MIMO neural circuits." Computational intelligence and neuroscience (2009): 2.

Alvarez, 'Review of approximation techniques', PhD thesis, chapter 2, pp. 7-14, University of Bradford, 2000.

Makridakis et al., 'Evaluating Accuracy (or Error) Measures', INSEAD Technical Report, 1995/18/TM.

Abbott et al. (2000), "Synaptic plasticity: taming the beast", Nature Neuroscience, 3, 1178-1183.

Bartlett et al., "Convexity, Classification, and Risk Bounds" Jun. 16, 2005, pp. 1-61.

Bartlett et al., "Large margin classifiers: convex loss, low noise, and convergence rates" Dec. 8, 2003, 8 pgs.

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

Brette et al., Brain: a simple and flexible simulator for spiking neural networks, The Neuromorphic Engineer, Jul. 1, 2009, pp. 1-4, doi: 10.2417/1200906.1659.

Cessac et al. "Overview of facts and issues about neural coding by spikes." Journal of Physiology, Paris 104.1 (2010): 5.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. "Probability distributions of the logarithm of inter-spike intervals yield accurate entropy estimates from small datasets." Journal of neuroscience methods 173.1 (2008): 129.

Fidjeland et al. "Accelerated Simulation of Spiking Neural Networks Using GPUs" WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.

Floreano et al., "Neuroevolution: from architectures to learning" Evol. Intel. Jan. 2008 1:47-62, [retrieved Dec. 30, 2013] retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2( 4 ): 1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al. "Rapid neural coding in the retina with relative spike latencies." Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich et al., "Relating STDP to BCM", Neural Computation (2003) 15, 1511-1523.

Izhikevich, "Simple Model of Spiking Neurons", IEEE Transactions on Neural Networks, vol. 14, No. 6, Nov. 2003, pp. 1569-1572.

Jin et al. (2010) "Implementing Spike-Timing-Dependent Plasticity on SpiNNaker Neuromorphic Hardware", WCCI 2010, IEEE World Congress on Computational Intelligence.

Karbowski et al., "Multispikes and Synchronization in a Large Neural Network with Temporal Delays", Neural Computation 12, 1573-1606 (2000)).

Khotanzad, "Classification of invariant image representations using a neural network" IEEF. Transactions on Acoustics, Speech, and Signal Processing, vol. 38, No. 6, Jun. 1990, pp. 1028-1038 [online],

(56) References Cited

OTHER PUBLICATIONS

[retrieved on Dec. 10, 2013]. Retrieved from the Internet <URL:http://www-ee.uta.edu/eeweb/IP/Courses/SPR/Reference/Khotanzad.pdf>.
Laurent, "The Neural Network Query Language (NNQL) Reference" [retrieved on Nov. 12, 2013]. Retrieved from the Internet: <URL https://code.google.com/p/nnql/issues/detail?id=1>.
Laurent, "Issue 1—nnql—Refactor Nucleus into its own file—Neural Network Query Language" [retrieved on Nov. 12, 2013]. Retrieved from the Internet: <URL:https:1/code.google.com/p/nnql/issues/detail?id=1>.
Lazar et al. "A video time encoding machine", in Proceedings of the 15th IEEE International Conference on Image Processing (ICIP '08}, 2008, pp. 717-720.
Lazar et al. "Consistent recovery of sensory stimuli encoded with MIMO neural circuits." Computational intelligence and neuroscience (2010): 2.
Lazar et al. "Multichannel time encoding with integrate-and-fire neurons." Neurocomputing 65 (2005): 401-407.
Masquelier, Timothee. "Relative spike time coding and STOP-based orientation selectivity in the early visual system in natural continuous and saccadic vision: a computational model." Journal of computational neuroscience 32.3 (2012): 425-441.
Nguyen et al., "Estimating divergence functionals and the likelihood ratio by penalized convex risk minimization" 2007, pp. 1-8.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Sato et al., "Pulse interval and width modulation for video transmission." Cable Television, IEEE Transactions on 4 (1978): 165-173.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.
Simulink® model [online], [Retrieved on Dec. 10, 2013] Retrieved from <URL:http://www.mathworks.com/products/simulink/index.html>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.
Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL:http://www.ploscompbiol.org/article/info%3Adoi%2F10.1371%2Fjournal.pcbi.1000879#>.
Wang "The time dimension for scene analysis." Neural Networks, IEEE Transactions on 16.6 (2005): 1401-1426.
Sjostrom et al., "Spike-Timing Dependent Plasticity" Scholarpedia, 5(2):1362 (2010), pp. 1-18.
PCT International Search Report and Written Opinion for PCT/US14/48512 dated Jan. 23, 2015, pp. 1-14.
http://www.braincorporation.com/specs/BStem_SpecSheet_Rev_Nov11_2013.pdf.
Specification, figures and EFS receipt of U.S. Appl. No. 14/265,113, filed Apr. 29, 2014 and entitled "Trainable convolutional network apparatus and methods for operating a robotic vehicle" (71 pages).
Specification, figures and EFS receipt of U.S. Appl. No. 14/285,385, filed May 22, 2014 and entitled "Apparatus and methods for real time estimation of differential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt of U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitled "Apparatus and methods for distance estimation using stereo imagery" (75 pages).
Specification, figures and EFS receipt of U.S. Appl. No. 14/489,242, filed Sep. 17. 2014 and entitled "Apparatus and methods for remotely controlling robotic devices" (100 pages).
Specification, figures and EFS receipt of U.S. Appl. No. 14/542,391, filed Nov. 14, 2014 and entitled "Feature detection apparatus and methods for training of robotic navigation" (83 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/244,888, filed Apr. 3, 2014 and entitled "Learning apparatus and methods for control of robotic devices via spoofing" (100 pages).
Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/244,892, filed Apr. 3, 2014 and entitled "Spoofing remote control apparatus and methods" (95 pages).
Specification, figures and EFS receipt of U.S. Appl. No. 14/588,168, filed Dec. 31, 2014 and entitled "Apparatus and methods for training robots" (101 pages).
Specification, figures and EFS receipt of U.S. Appl. No. 14/705,487, filed May 6, 2015 and entitled "Persistent predictor apparatus and methods for task switching" (119 pages).

* cited by examiner

FIG. 4B  FIG. 4C

ADAPTIVE ROBOTIC INTERFACE APPARATUS AND METHODS

CROSS-REFERENCE TO RELATED APPLICATIONS

This application is related to co-pending and co-owned U.S. patent application Ser. No. 13/842,530 entitled "ADAPTIVE PREDICTOR APPARATUS AND METHODS", filed Mar. 15, 2013, U.S. patent application Ser. No. 13/842,562 entitled "ADAPTIVE PREDICTOR APPARATUS AND METHODS FOR ROBOTIC CONTROL", filed Mar. 15, 2013, U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, U.S. patent application Ser. No. 13/842,647 entitled "MULTICHANNEL ROBOTIC CONTROLLER APPARATUS AND METHODS", filed Mar. 15, 2013, and U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to adaptive control and training of robotic devices.

2. Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Robotic devices may comprise hardware components that may enable the robot to perform actions in 1, 2, and/or 3-dimensional space. Some robotic devices may comprise one or more components configured to operate in more than one spatial dimension (e.g., a turret and/or a crane arm configured to rotate around vertical and/or horizontal axes). Some robotic devices may be configured to operate in more than one spatial dimension orientation so that their components may change their operational axis (e.g., with respect to vertical direction) based on the orientation of the robot platform. Such modifications may be effectuated by an end user of the robot.

SUMMARY

One aspect of the disclosure relates to a non-transitory computer readable medium having instructions embodied thereon. The instructions are executable to perform a method for controlling a robotic platform. The method may comprise establishing a data connection to a robotic device; receiving information related to a phenotype of the robotic device; and issuing a command to a user interface apparatus, the user interface apparatus executing an action based on the command, the command indicative of at least one configuration associated with the information. The user interface apparatus may comprise a display apparatus comprising at least one control configured to relay user input to the robotic device. Executing the action may cause the user interface apparatus to alter a representation of the at least one control consistent with the information.

In some implementations, the command may be configured to be issued automatically absent an explicit request by the user.

In some implementations, the phenotype may be characterized by one or both of (i) a hardware configuration of the robotic device or (ii) an operational configuration of the robotic device. The information may be based on a statistical parameter related to a plurality of actions executed by the robot responsive to a plurality of user commands relayed by the control. Individual ones of the plurality of actions may be configured based on at least one of the hardware configuration the operational configuration of the robotic device.

In some implementations, the robotic device may comprise at least one actuator characterized by an axis of motion. The information may be configured to relate an orientation of the axis of motion with respect to a reference orientation.

In some implementations, the reference orientation may comprise a geographical coordinate. The information may comprise a computer design file of the robotic device. The design file may comprise a description of the actuator and the axis of motion.

In some implementations, the reference orientation may comprise an axis of the robotic device. The display apparatus may be characterized by a default orientation. Altering the representation of the at least one control consistent with the information may comprise: determining an angle between the reference orientation and the axis of motion; and positioning the at least one control on the display apparatus at the angle relative the default orientation.

In some implementations, the robotic device may comprise first and second actuators configured to displace at least a portion of the robotic device in a first direction and a second direction, respectively. The information may comprise parameters of the first direction and the second direction. The at least one control may comprise a first linear motion control and a second linear motion control associated with the first actuator and the second actuator, respectively. The act of altering the representation of the at least one control consistent with the information may comprise: positioning the first linear motion control at the first direction; and positioning the second linear motion control at the second direction, the second direction being perpendicular to the first direction.

In some implementations, the robotic device may be characterized as having a default orientation. The first direction and the second direction may comprise a direction of longitudinal and transverse motions relative to the default orientation.

In some implementations, the robotic device may be characterized as having a default orientation. The robotic device may comprise a first actuator configured to rotate at least a portion of the robotic device around first axis configured vertically with respect to the default orientation. A second actuator may be configured to move the robotic device in a longitudinal direction relative the default orientation. The act of altering the representation of the at least one control consistent with the information may comprise: positioning the first linear motion control along the first direction; and positioning the second linear motion control along the second direction, the second direction being perpendicular to the first direction.

In some implementations, the first control may comprise a knob having an axis of rotation configured such that mutual orientation of the axis of rotation and the default direction matches mutual orientation of the first axis and the default orientation of the robotic device.

In some implementations, the at least one control may comprise: a first slider configured to relate forward and reverse motion commands; and a second slider configured to relate left and right turn commands, and reverse motion commands. Main axes of the first and the second sliders may be disposed perpendicular with one another.

In some implementations, the phenotype may be characterized by one or both of (i) hardware configuration of the robotic device or (ii) operational configuration of the robotic device. The information may be configured to relate modification of one or both of the hardware configuration or the operational configuration of the robotic device.

In some implementations, the hardware configuration of the robotic device may comprise one or more of a number of motor actuators, a rotation axis orientation for individual actuators, or a number of actuators configured to be activated simultaneously.

In some implementations, the operational configuration of the robotic device may comprise one or more of a number of motor actuators, a rotation axis orientation for individual actuators, or a number of actuators configured to be activated simultaneously.

Another aspect of the disclosure relates to a remote control apparatus of a robot. The apparatus may comprise a processor, at least one remote communications interface, and a user interface. The at least one remote communications interface may be configured to: establish an operative link to the robot; and communicate to the processor one or more configuration indicators associated with a component of the robot. The user interface may be configured to: based on a receipt of the configuration indicator, display one or more human perceptible control elements consistent with a characteristic of the component.

In some implementations, the user interface may comprise a display apparatus. The component may comprise one or both of a wheel or a joint, characterized by axis of rotation. The characteristic of the component may be configured to describe placement of the axis with respect to a reference direction. The displaying of one or more human perceptible control elements consistent with the characteristic may comprise disposing the control element on the display apparatus at an orientation matching the placement of the axis with respect to the reference.

In some implementations, the robot may comprise a sensor configured to determine the placement of the axis with respect to the reference. The robot may detect and communicate an operation configuration of one of its elements.

In some implementations, the user interface may comprise one or more of touch-sensing interface, a contactless motion sensing interface, or a radio frequency wireless interface.

Yet another aspect of the disclosure relates to a method of communicating a robot operational characteristic. The method may comprise: configuring the robot to detect the operational characteristic; and enabling communication by the robot of the operational characteristic. The communication of the operational characteristic may be configured to cause adaptation of the user interface device configured to operate the robot.

In some implementations, the robot may comprise an operational element comprising at least one of a wheel or a joint, characterized by an axis of rotation. The operational characteristic may comprise an angle of the axis relative a reference direction. The adaptation may comprise disposing a control element associated with the operational element at the angle and/or displacement relative to the reference on the user interface device.

In some implementations, the method may comprise: configuring the robot to detect a modification of the operational characteristic; and, responsive to detected modification of the operational characteristic, communicating the modified operational characteristic associated with the operational element. The communication of the modified operational characteristic may be configured to cause modification of the control element consistent with the modified operational characteristic.

In some implementations, the modification of the operational characteristic may comprise a change of the angle and/or displacement by an adjustment amount. The modification of the control element consistent with the modified operational characteristic may comprise adjustment of the disposed control element by the adjustment amount.

In some implementations, the modification of the operational characteristic may comprise a change of the angle and/or the displacement by an adjustment amount. The modification of the control element consistent with the modified operational characteristic may comprise adjustment of the disposed control element by the adjustment amount.

In some implementations, the robot may comprise a humanoid robot comprising a first joint configured to be rotated with respect to a first axis and a second joint configured to be rotated with respect to second axis. The first and the second axes may be disposed at a non-zero angle relative to one another. The adaptation of the user interface device may be configured to dispose a first control element and a second control element adapted to control the first joint and the second joint, respectively, at the angle with respect to one another.

In some implementations, the humanoid robot may comprise a robotic apparatus with its body shape built to resemble that of the human body.

These and other features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 4B is a graphical illustration depicting user interface controllers configured of the apparatus of FIG. 4A, according to one or more implementations.

FIG. 4C is a graphical illustration depicting user interface controllers configured of the apparatus of FIG. 4A, according to one or more implementations.

Figure 1:
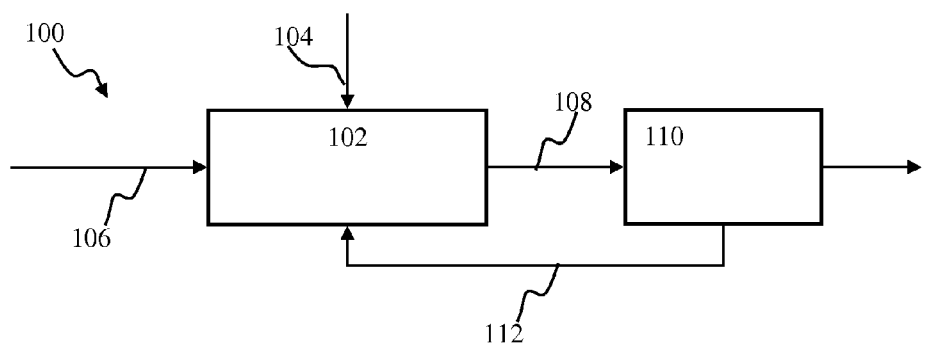
FIG. 1 is a block diagram illustrating a robotic apparatus, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1 illustrates one implementation of an adaptive robotic apparatus for use with the robot training methodology described hereinafter. The apparatus 100 of FIG. 1 may comprise an adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 106 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1 may be encoded as spikes, as described in detail in U.S. patent application Ser. No. 13/842,530 entitled "ADAPTIVE PREDICTOR APPARATUS AND METHODS", filed Mar. 15, 2013, incorporated supra.

The controller 102 may be operable in accordance with a learning process (e.g., reinforcement learning and/or supervised learning). In one or more implementations, the controller 102 may optimize performance (e.g., performance of the system 100 of FIG. 1) by minimizing average value of a performance function as described in detail in co-owned U.S. patent application Ser. No. 13/487,533, entitled "STOCHASTIC SPIKING NETWORK LEARNING APPARATUS AND METHODS", incorporated herein by reference in its entirety.

Learning process of adaptive controller (e.g., 102 of FIG. 1) may be implemented using a variety of methodologies. In some implementations, the controller 102 may comprise an artificial neuron network e.g., the spiking neuron network described in U.S. patent application Ser. No. 13/487,533, entitled "STOCHASTIC SPIKING NETWORK LEARNING APPARATUS AND METHODS", filed Jun. 4, 2012, incorporated supra, configured to control, for example, a robotic rover.

Individual spiking neurons may be characterized by internal state. The internal state may, for example, comprise a membrane voltage of the neuron, conductance of the membrane, and/or other parameters. The neuron process may be characterized by one or more learning parameters, which may comprise input connection efficacy, output connection efficacy, training input connection efficacy, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 104 in FIG. 1) may be differentiated from sensory inputs (e.g., inputs 106) as follows. During learning, data (e.g., spike events) arriving to neurons of the network via input 106 may cause changes in the neuron state (e.g., increase neuron membrane potential and/or other parameters). Changes in the neuron state may cause the neuron to generate a response (e.g., output a spike). Teaching data arriving to neurons of the network may cause (i) changes in the neuron dynamic model (e.g., modify parameters a,b,c,d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning), data (e.g., spike events) arriving to neurons of the network may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

In one or more implementations, such as object recognition and/or obstacle avoidance, the input 106 may comprise a stream of pixel values associated with one or more digital images. In one or more implementations (e.g., video, radar, sonography, x-ray, magnetic resonance imaging, and/or other types of sensing), the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present technology. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NETWORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in co-owned U.S. patent application Ser. No. 13/239,255 , filed Sep. 21, 2011, entitled "APPARATUS AND METHODS FOR SYNAPTIC UPDATE IN A PULSE-CODED NETWORK"; 201220, U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and U.S. patent application Ser. No. 13/560,891 entitled "APPARATUS AND METHODS FOR EFFICIENT UPDATES IN SPIKING NEURON NETWORKS", each of the foregoing being incorporated herein by reference in its entirety.

A neuron process may comprise one or more learning rules configured to adjust neuron state and/or generate neuron output in accordance with neuron inputs.

In some implementations, the one or more learning rules may comprise state dependent learning rules described, for example, in U.S. patent application Ser. No. 13/560,902, entitled "APPARATUS AND METHODS FOR STATE-DEPENDENT LEARNING IN SPIKING NEURON NETWORKS", filed Jul. 27, 2012 and/or pending U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more leaning rules may be configured to comprise one or more reinforcement learning, unsupervised learning, and/or supervised learning as described in co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Adaptive controller (e.g., the controller apparatus 102 of FIG. 1) may comprise an adaptable predictor block configured to, inter alia, predict control signal (e.g., 108) based on the sensory input (e.g., 106 in FIG. 1) and teaching input (e.g., 104 in FIG. 1) as described in, for example, U.S. patent application Ser. No. 13/842,530 entitled "ADAPTIVE PREDICTOR APPARATUS AND METHODS", filed Mar. 15, 2013, incorporated supra.

Robotic devices (e.g., plant 110 of FIG. 1) may comprise components that may enable the robot to perform actions in 1, 2, and/or 3-dimensional space. Some robotic devices may comprise one or more components that may be configured to operate in more than one spatial dimension (e.g., a turret, and/or a crane arm). Such components may be configured to rotate around vertical and/or horizontal axes. Such configurations may be effectuated by a user of the robot, e.g., when assembling a robot using LEGO® Mindstorms kit. A robot may be trained by a user and/or trainer using, e.g., robot training methodology.

Figure 2A:
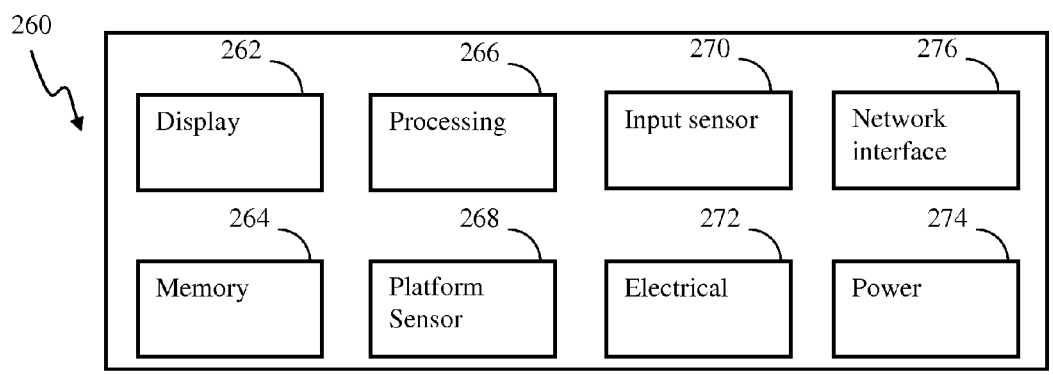
FIG. 2A is a functional block diagram illustrating a controller for a robotic apparatus, according to one or more implementations.

It may be beneficial to train and/or operate robotic devices using a remote control device. One implementation of a computerized controller apparatus configured for remote control a robotic devices is illustrated in FIG. 2A. The remote control apparatus 260 may comprise memory 264. Processing capacity 266 may be available for other hardware, firmware, and/or software needs of the controller device. The apparatus may comprise display 262 configured to represent control elements to the user. The apparatus may comprise input sensor 270 configured to receive user input. In one or more implementations, the display and the sensor functionality may be combined by a single physical block (e.g., a touch screen display). In some implementations, the display and the input sensor portions may be implemented separate from one another. In one or more implementations, the input sensor may comprise one or more of haptic sensor (e.g., pressure, capacitive, resistive touch sensor), light sensor (e.g., camera), audio sensor, electromagnetic sensor (e.g., infrared and/or radio frequency), vibrational sensor, ultrasonic sensor, temperature sensor, radar sensor, lidar sensor, sonar sensor, and/or other sensors. In one or more implementations, a user may provide commands to the controller via one or more of touch, speech, audio (e.g., clicks, claps, whistles, and/or other sounds), gestures, eye direction, and/or other types of input.

The display 262 may comprise any of a liquid crystal display (LCD), light emitting diode (LED), MEMS microshutter, interferometric modulator displays (IMOD), carbon nanotube-based displays, digital light projection, and/or other applicable hardware display implementations.

The device 260 may comprise a mechanical platform (e.g., enclosure and/or frame), platform sensor 268, electrical components 272, power components 274, network interface 276, and/or other components. In some implementations, the platform sensor 268 may comprise a position sensor and/or an orientation sensor configured to determine location and/or orientation of the remote control 26 relative a reference (e.g., geographical reference and/or robot frame reference). Consistent with the present disclosure, the various components of the device may be remotely disposed from one another, and/or aggregated. For example, processing (e.g., user input recognition) may be performed by a remote server apparatus, and the processed data (e.g., user commands) may be communicated to the remote controller via the network interface 276.

The electrical components 272 may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical devices. These devices may enable a wide array of applications for the robotic apparatus in industrial, hobbyist, building management, medical device, military/intelligence, and/or other fields (as discussed below).

The network interface may include one or more connections to external computerized devices to allow for, inter alia, management of the robotic device. The connections may include any of the wireless and/or wire-line interfaces discussed above. The connections may include customized and/or proprietary connections for specific applications.

The power system 274 may be tailored to the needs of the application of the device. For example, for some implementations, a wireless power solution (e.g. battery, solar cell, inductive (contactless) power source, rectification, and/or other wireless power solution) may be appropriate. For other implementations, however, battery backup and/or direct wall power may be superior.

Various realizations the remote control apparatus 260 may be envisaged, such as, for example, a tablet computer, a smartphone, a portable computer (laptop), and/or other device comprising a display and a user input interface. In one or more implementations, the user input interface may comprise one of touch sensor, sound sensor, proximity sensor, visual sensor, and/or other sensor.

Figure 2B:
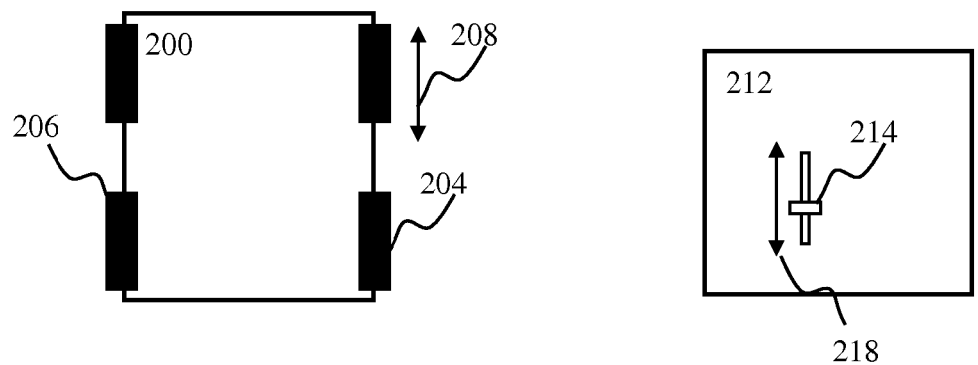
FIG. 2B is a functional block diagram illustrating a robotic rover apparatus comprising two drive wheels and a controller associated therewith, according to one or more implementations.

The remote control apparatus may be configured to interface to a robotic device (e.g., rover 200 of FIG. 2B). The display 262 may be configured to display one or more controls corresponding to one or more components of the robotic device. In one or more implementations, the controllable components of the robotic device may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, arms, actuators, legs, and/or other components. The controller 260 may be utilized to enable physical interaction and manipulation of these components.

In some implementations, particularly wherein the robotic device may comprise multiple controllable components (e.g., two wheels 206, 208 in FIG. 2B), the remote control interface may be adapted to present individual controls corresponding to one or more individual components of the robotic plant. As shown in FIG. 2B, the remote control display 212 may comprise slider control 214 operable along direction shown by arrow 218. The 214 may be utilized by a use to operate motor configured to rotate the wheels 206, 204 of the rover 206 along direction illustrated by arrow 208.

Figure 2C:
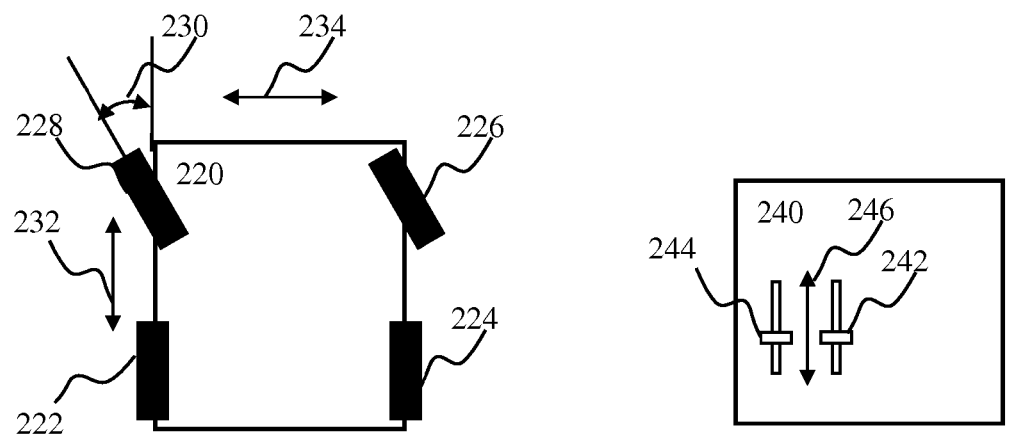
FIG. 2C is a functional block diagram illustrating a robotic rover apparatus, comprising two articulated drive wheels, and a controller associated therewith, according to one or more implementations.

FIG. 2C illustrates a robotic rover 220 comprising a pair of fixed-angle wheels 222, 224 and a pair of articulating wheels 226, 228. Generally speaking, fixed-angle wheels may describe wheels that rotate about a fixed axis and do not pivot (e.g., the rear wheels of a car). Articulating wheels may describe wheels that rotate about a pivotable axis (e.g., the front wheels of a car). The fixed angle wheels may be configured to propel the rover 220 along direction denoted by arrow 232. The articulated wheels 228 may be coupled to a motor actuator configured to rotate the wheels 226, 228 by angle 230 thereby enabling rover displacement in a direction denoted by arrow 234. A remote controller 240 associated with the rover implantation 220 may comprise a pair of slide control elements 244, 242 configured to be moved by a user along direction 246. In one or more implementations, the slider 242 may be utilized to control the rear wheels 222, 224, thereby controlling rover forward/back movement 232; the slider 244 may be utilized to control angle 228 of the front wheels 226, 228, thereby controlling rover left/right movement 232.

In some implementations, the remote control realization 240 may be utilized with a rover configuration (not shown) comprising four motorized wheels configured to be controlled in pairs (e.g., front and back right wheels, and front and back left wheels).

While motion of the control element configured to control forward/back motion may match the direction of the rover movement associated with the slider 242 (e.g., arrows 232 and 246 are parallel with one another), motion of the control element configured to control left/right rover movement (e.g., slider 244) may not match the direction of the rover movement (e.g., arrows 234 and 246 are perpendicular with one another). Some implementations may include a remote control configured such that configuration of control elements (e.g., sliders 242, 244) matches the direction of respective robot motions (e.g., 232, 234, respectively).

Figure 3:
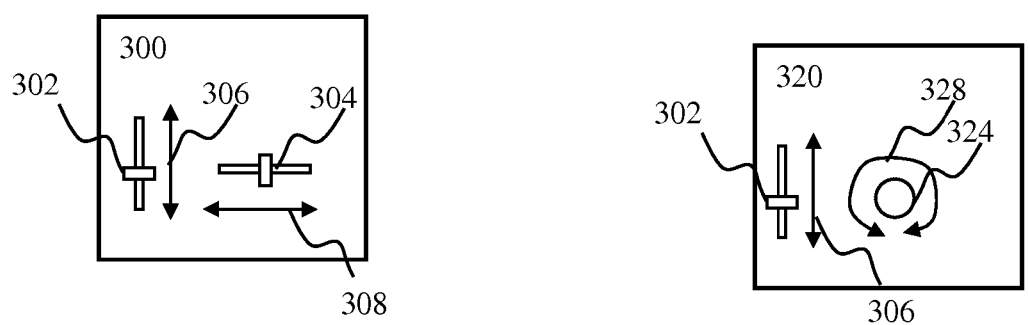
FIG. 3 is a functional block diagram illustrating a user interface controller configured in accordance with operational characteristics of the robotic rover apparatus comprising two articulated drive wheels, according to one or more implementations.

FIG. 3 illustrates a robotic controller configured consistent with phenotype of the robot being controlled. The term phenotype may describe an operational and/or hardware configuration of the robot. By way of illustration, two robots comprising two legs and four legs may be referred to as comprising different phenotype; two robots, each comprising manipulator configured to be rotated around two different axes (e.g., oriented at a non-zero angle with respect to one another) may be referred to as comprising different phenotypes.

The controller 300 may be configured to operate a robotic device configured to move in a plane characterized by two orthogonal motion components (e.g., rover 220 configured to move on a horizontal plane characterized by components 232, 234). The controller apparatus 300 may comprise sliders 302, 304 disposed such that direction of their movement 306, 308, respectively, matches motion components of the rover (e.g., components 232, 234 of the rover 220). In one or more implementations, the control element 302 may be referred to as the speed control (throttle). The control element 304 may be referred to as direction control (steering.)

In some implementations, steering control elements of the controller apparatus configured to control motion of a rover in two dimensions may comprise a knob, e.g., 324 of the controller 320 in FIG. 3. Turning of the knob indicated by the curve 328 may enable control of the rover motion direction component (e.g., component 234 of the rover 220).

In one or more implementations, the controller 300 and/or 320 may be utilized to control a rover comprising four motorized wheels controllable in pairs (e.g., front and back right wheels, and front and back left wheels).

Figure 4A:
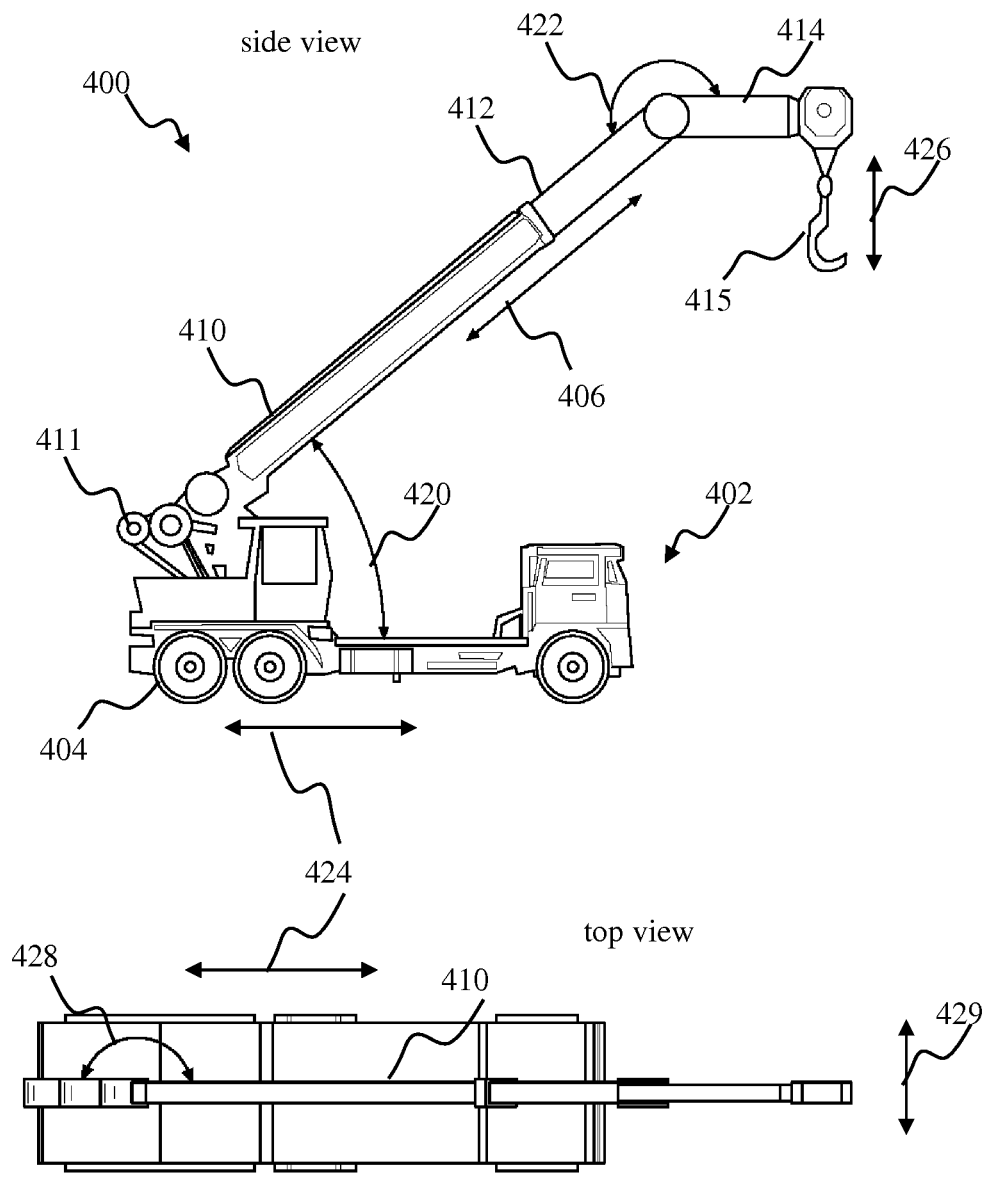
FIG. 4A is a graphical illustration depicting a robotic apparatus capable of operating in 3 spatial dimensions, according to one or more implementations.

FIG. 4A illustrates a robotic apparatus comprising multiple controllable components operable in two or more degrees of freedom (DoF). The apparatus 400 may comprise a platform 402 configured to traverse the robotic apparatus 400 in a direction indicated by arrow 424. In some implementations, the platform may comprise on or more motor driven wheels (e.g., 404) and/or articulated wheels.

The platform may be adapted to accept a telescopic arm 410 disposed thereupon. The arm 410 may comprise one or more portions (e.g., boom 412, portion 414) configured to be moved in directions shown by arrows 406 (telescope boom 412 in/out); 422 (rotate the portion 414 up/down). A utility attachment 415 may be coupled to the arm 414. In one or more implementations, the attachment 415 may comprise a hook, a grasping device, a ball, and/or any applicable attachment. The attachment 415 may be moved in direction shown by arrow 426. The arm 410 may be configured to elevate up/down (using for example, motor assembly 411) and/or be rotated as shown by arrows 420, 428 respectively in FIG. 4A.

FIG. 4B-4C illustrate robotic controller realizations configured consistent with phenotype of the robotic apparatus of FIG. 4A. The controller 450 of FIG. 4B may comprises a plurality of controls elements adapted to manipulate the platform 402 (e.g., controls 462, 464), and the arm 410 (e.g., the controls 452, 454, 456, 458). One or more of the controls 452, 454, 456, 458, 462, 464, may comprise joystick, slider and/or another control type (e.g., knob 478 described with respect to FIG. 4C). The control elements in FIGS. 4B-4C may comprise hardware elements and/or software control rendered, for example, on a touch screen of a portable computerized device (e.g., smartphone, tablet, and/or other portable device). In some implementations the control elements may consist of the configuration of a contactless motion sensing interface system, with and/or without an explicit indication as to the current configuration. In the case of an explicit indication, for example, the configuration may be indicated by representations displayed via a screen, or via changes on a device held by the user to perform the motions, or via light projected onto the source of motion (e.g., onto the hands of the human operator).

The control elements 464, 462 may be configured to operate along directions 462, 460, respectively, and control two dimensional motion of the platform 402 (shown by arrows 424, 429, respectively in FIG. 4A). The control elements 456, 462, 464 may be configured to operate along direction 463 and control vertical motion of the attachment 415, the arm 410, the and/or boom 412. The control element 458 may be adapted to control the horizontal orientation of the arm 410 (e.g., as shown by the arrow 428 in FIG. 4A). Another control element(s) (not shown) may be used to control the rotation 422 of the portion 414.

In some implementations of the robotic device (e.g., the robotic apparatus 400), the portion 414 may be omitted during device configuration, and/or configured to extend/telescope in/out. The controller 450 interface may be configured to in accordance with modification of the robotic device, by for example, providing an additional control element (not shown) to control the extension of the portion 414. In some implementations in order to reduce number of controls, additional control operations may be effectuated by contemporaneous motion of two or more control elements. By way of example, simultaneous motion of control elements 454, 456 may effectuate extension control of the portion 414.

The controller 457 of FIG. 4C may comprise a plurality of controls elements adapted to manipulate the platform 402 (e.g., controls 482, 480), and the arm 410 (e.g., the controls 472, 474, 476, 478). One or more of the controls 472, 474, 476, 480 may comprise joystick, slider and/or another linear motion control type. The elements 478, 482 may comprise rotary motion controls (e.g., knobs) configured to be rotates as shown by arrows 486, 488, respectively. The control elements in FIGS. 4B-4C may comprise hardware elements and/or software control rendered, for example, on a touch screen of a portable computerized device (e.g., smartphone, tablet).

A remote controller user interface configured in accordance with the robotic phenotype may be referred to as having matching, conforming, and/or compliant configuration. The methodology providing conforming remote controllers may be utilized with robotic devices configurable to operate in multiple phenotype configurations. In some implementations, multiple phenotype configurations may be effectuated due to a reconfiguration and/or replacement of a portion of robotic plant (e.g., replacing horizontally rotating manipulator arm with a telescopic arm). In one or more implementations, individual ones of multiple phenotypes may be realized by operating a robot in different orientations, e.g., as illustrated below.

Figure 5A:
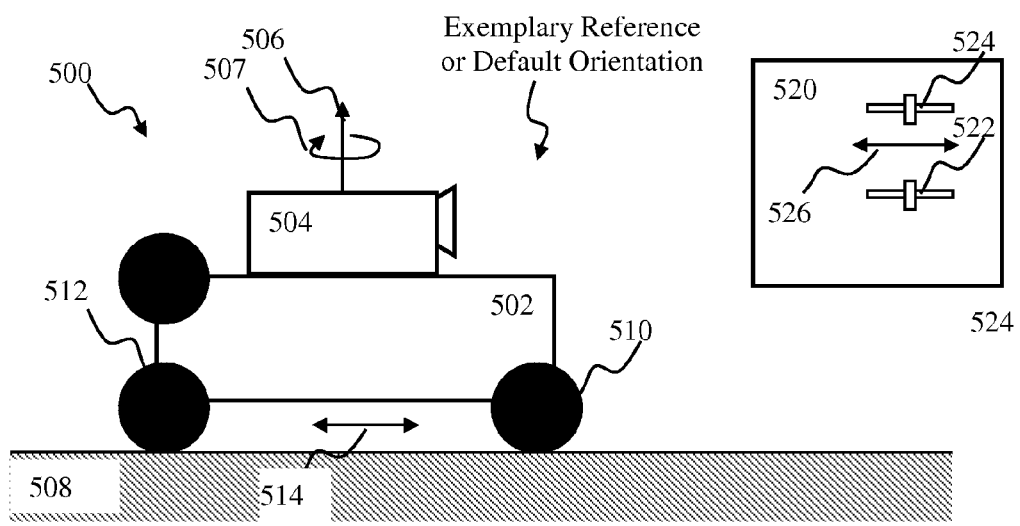
FIG. 5A is a functional block diagram illustrating adaptive configuration of a robot controller responsive to a change of robot operational configuration, according to one or more implementations.
Figure 5B:
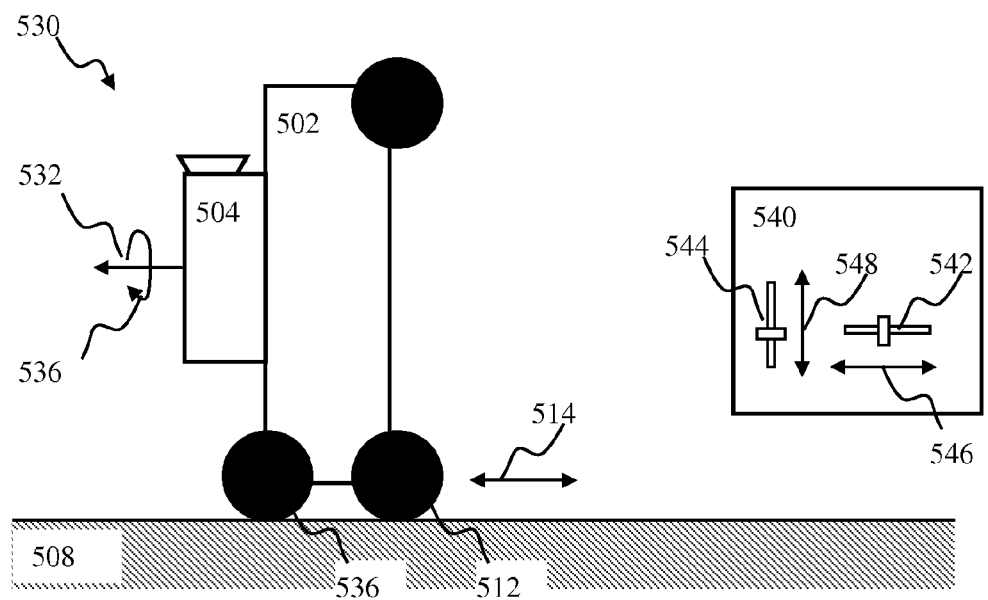
FIG. 5B is a functional block diagram illustrating adaptive configuration of a robot controller responsive to a change of robot operational configuration, according to one or more implementations.

FIGS. 5A-5B illustrate adaptation of a remote control interface based on robot configuration 500, 520. The robot of configuration 500 may be adapted to move along surface 508 along directions shown by arrow 514 using two (or more) wheels 510, 512. In some implementations, the wheels 510, 512 may comprise wheel pairs with one or more wheel pairs being driven by a motor. The robot may comprises a turret 504 configured to rotate around axis 506. The turret 504 may be configured to support a sensing and/or projection apparatus such as an antenna, searchlight, camera lens, and/or other device. The direction 514 may correspond to horizontal surface, the axis 506 may be configured vertical as shown in FIG. 5A.

A robot of configuration 500 may be provided with a remote controller apparatus 520. User interface of the remote controller 520 may comprise two slider control elements 522, 524. The control elements 522, 524 may be configured to be moved along direction shown by arrow 526. In, some implementations, displacing the slider 524 along direction 526 may cause left/right motion (e.g., shown by arrow 514) of the rover 502; displacing the slider 522 along direction 526 may cause left/right rotation of the turret 504 (e.g., shown by arrow 507).

The rover 502 may be configurable to operate in orientation shown in FIG. 5A and another orientation shown in FIG. 5B. In the configuration 530, the robot 502 may be adapted to move along the surface 508 along directions shown by the arrow 514 using wheels 510, 536. The robot 502 orientation 530 in FIG. 5B may be configured perpendicular to the robot orientation of FIG. 5A. The turret 504 of the robot configuration of FIG. 5B may rotate (e.g., up/down) with respect to the horizontal axis 532. Responsive to a change of rover operational configuration (e.g., from configuration 500 to 300), user interface 520 may adapt to reflect the change (e.g., a change of the turret 504 rotation direction).

Panel 540 in FIG. 5B illustrates a remote controlled configured in accordance with operational configuration 530 of the rover 502, in accordance with one or more implementations. User interface of the remote controller 540 may comprise two slider control elements 542, 544. The control element 542 may be configured to be moved along direction shown by arrow 546 thereby controlling left/right motion (e.g., shown by arrow 514) of the rover 502 in FIG. 5B. The control element 544 may be configured to be moved along direction shown by arrow 548. In some implementations, displacing the slider 544 along vertical direction may cause up/down motion of the rover turret 504 (e.g., shown by arrow 514) of the rover 502. Displacing the slider 522 along direction 526 may cause left/right rotation of the turret 504 (e.g., shown by arrow 536 in FIG. 5B). Configuring user interface of the remoter controller 540 consistent with the operational configuration 530 of the robot may facilitate training of robot 502 by a user.

Figure 6:
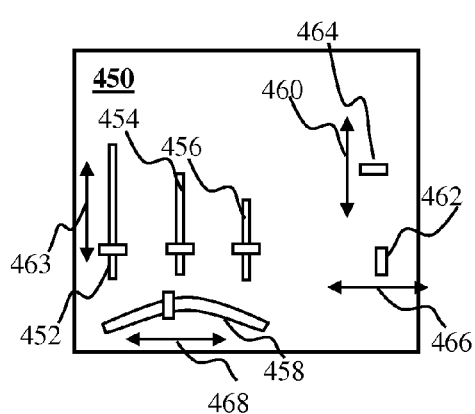
FIG. 6 is a functional block diagram depicting a computerized system configured for adaptive configuration of robotic controller, according to one or more implementations.
Figure 6:
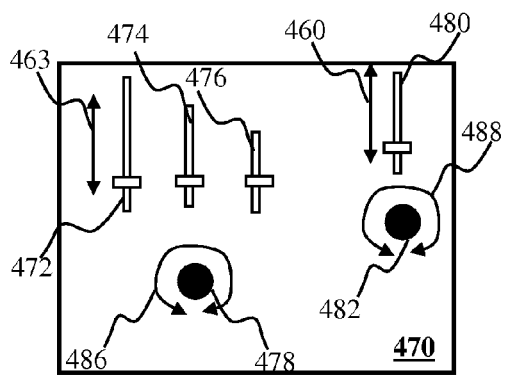
Figure 6:
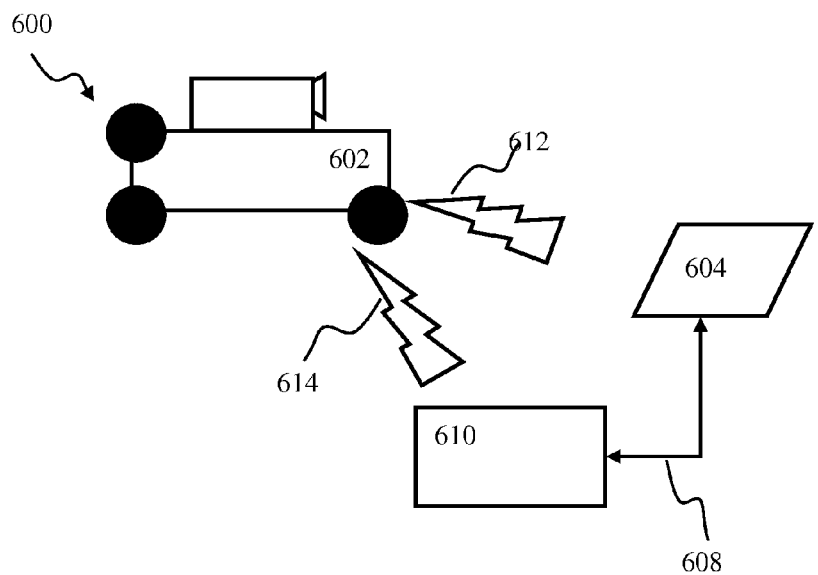

FIG. 6 illustrates an adaptive computerized system configured to enable adaptive configuration of robotic controller, according to one or more implementations. The system 600 may comprise a robotic apparatus 602 comprising one or more motorized operational elements (e.g., wheel, arm, manipulator, leg, and/or other). The robotic apparatus 602 may be configured to operate in more than one spatial dimension and/or orientation. The robotic apparatus 602 may comprise components configured to change their operational axis (e.g., with respect to vertical direction) based on the orientation of the robot platform. Such modifications may be effectuated by an end user of the robot during operation and/or assembly.

The robotic apparatus 602 may communicate with a remote controller device 604 via a remote link 612. In one or more implementations, the robotic apparatus 602 may comprise a mobile rover 200, 220, robotic apparatus 400, 502 of FIGS. 2B-2C, 4A, 5, respectively and/or another robot realization (e.g., bi-pedaling humanoid robot). In some implementations, the remote controller 604 may comprise an adaptable computerized user interface, e.g., as described above with respect to FIGS. 2A, 3. The remote interface 612 may comprise any applicable wired remote interface (USB, Ethernet, Firewire, and/or other wired remote interface) and/or wireless remote interface (e.g., radio frequency, light, ultrasonic, and/or other remote interface). The remote controller apparatus 604 may be configured to receive an operational configuration (e.g., number of joints, number of motor actuators, orientation of joints and/or motor actuators, and/or other operation configurations) of the robotic apparatus 602. In some implementations, the robot 602 may provide (push) the configuration via, e.g., link 612 to the remote controller 604. In one or more implementations, the remote controller may request (poll) an update of the robot 602 configuration via, e.g., link 612. In one or more implementations, the user may input robot configuration information into the remote controller apparatus 604.

In some implementations, the robot 602 may provide or publish the configuration via link 614 to a remote computerized device 610. In some implementations, the computerized device 610 may comprise a cloud server depository and/or remote server configured to store operational software and/or configuration of the robot 602. In some implementations, the apparatus 610 may be configured to store software code or firmware for download to one or more robotic devices (e.g., robotic apparatus 602), for example, the methodology described in U.S. patent application Ser. No. 13/830,398 entitled "NEURAL NETWORK LEARNING AND COLLABORATION APPARATUS AND METHODS" (the '398 application), filed Mar. 14, 2013, incorporated herein by reference in its entirety. As described in the '398 application, the cloud server may connect to the robotic apparatus 602 (or otherwise accesses information about the apparatus, such as from a network server or cloud database, or other user device)

to collect hardware and other data of utility in determining compatibility with available software images. In some implementations, the user interface device 604 may collect this information from the robotic apparatus 602 and forward it to the server 610. The user interface device 604 may retrieve configuration of the robotic apparatus 602 from the depository 610 via link 608. In one or more implementations, the link 608 may comprise wired link (e.g., USB, SPI, I2C, Ethernet, Firewire, and/or other wired link) and/or wireless link (e.g., radio frequency, light, ultrasonic, and/or other wireless link). The remote controller apparatus may utilize updated robot configuration information to configure a user interface in accordance with the robot operational configuration using any of the applicable methodologies described herein.

Figure 7:
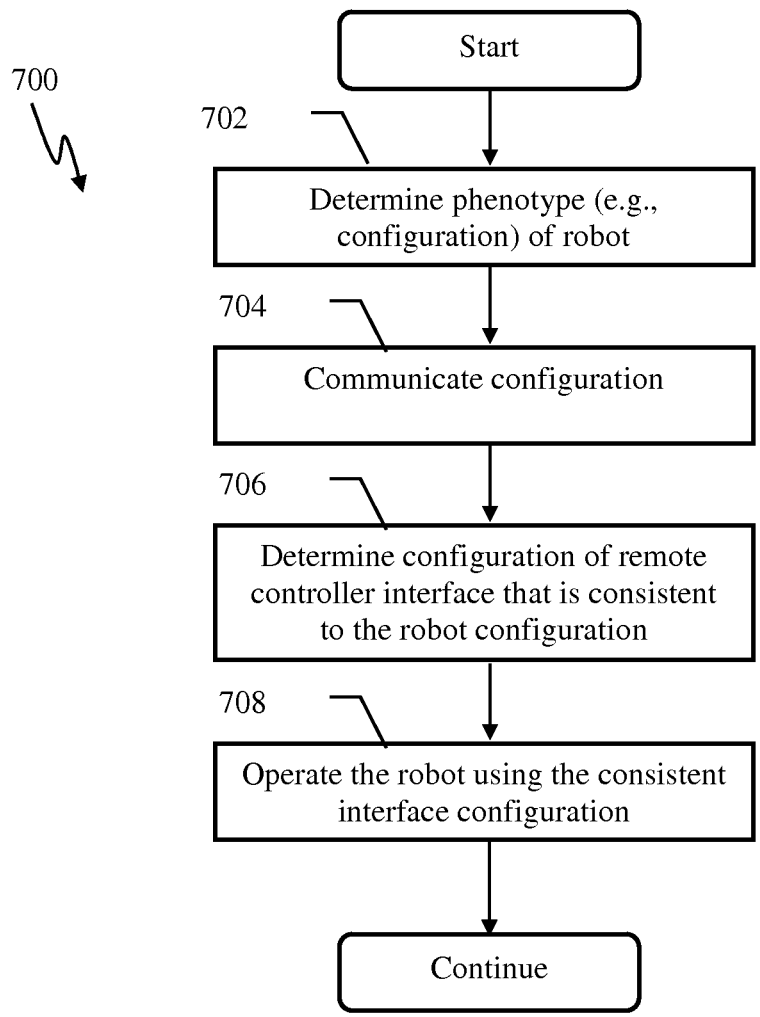
FIG. 7 is a logical flow diagram illustrating a method of operating an adaptive robotic device, in accordance with one or more implementations.
Figure 8A:
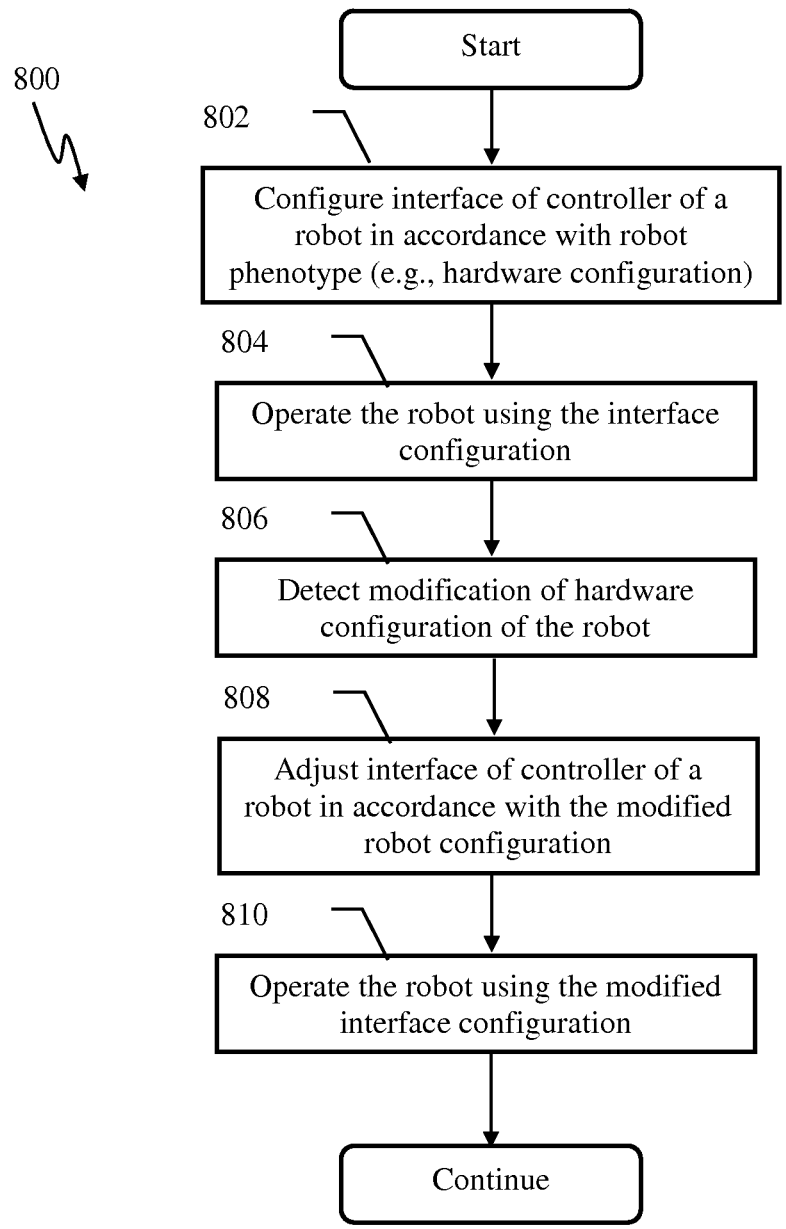
FIG. 8A is a logical flow diagram illustrating a method of adapting remote controller of a robot based on a change of robot configuration, in accordance with one or more implementations.
Figure 8B:
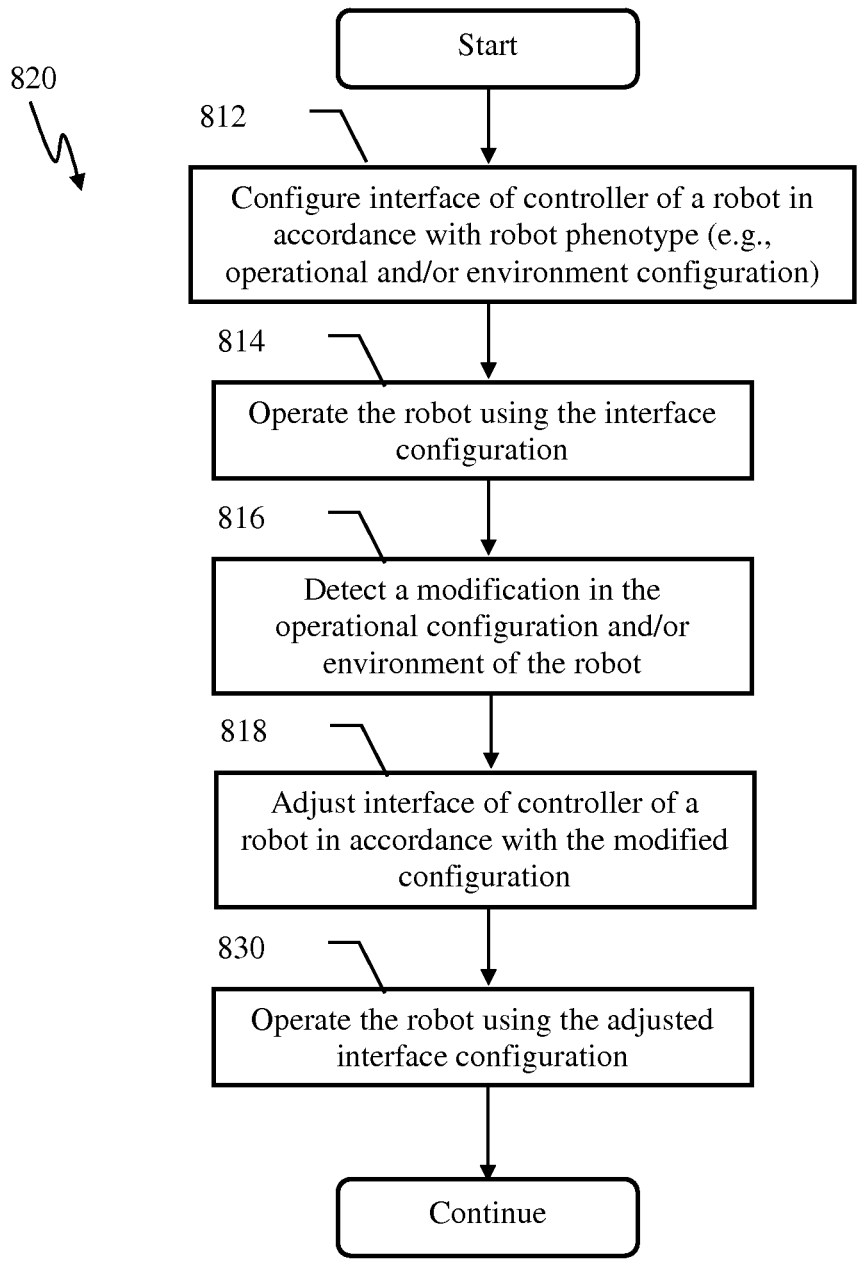
FIG. 8B is a logical flow diagram illustrating a method of adapting remote controller of a robot based on a change of operating environment, in accordance with one or more implementations.
Figure 9:
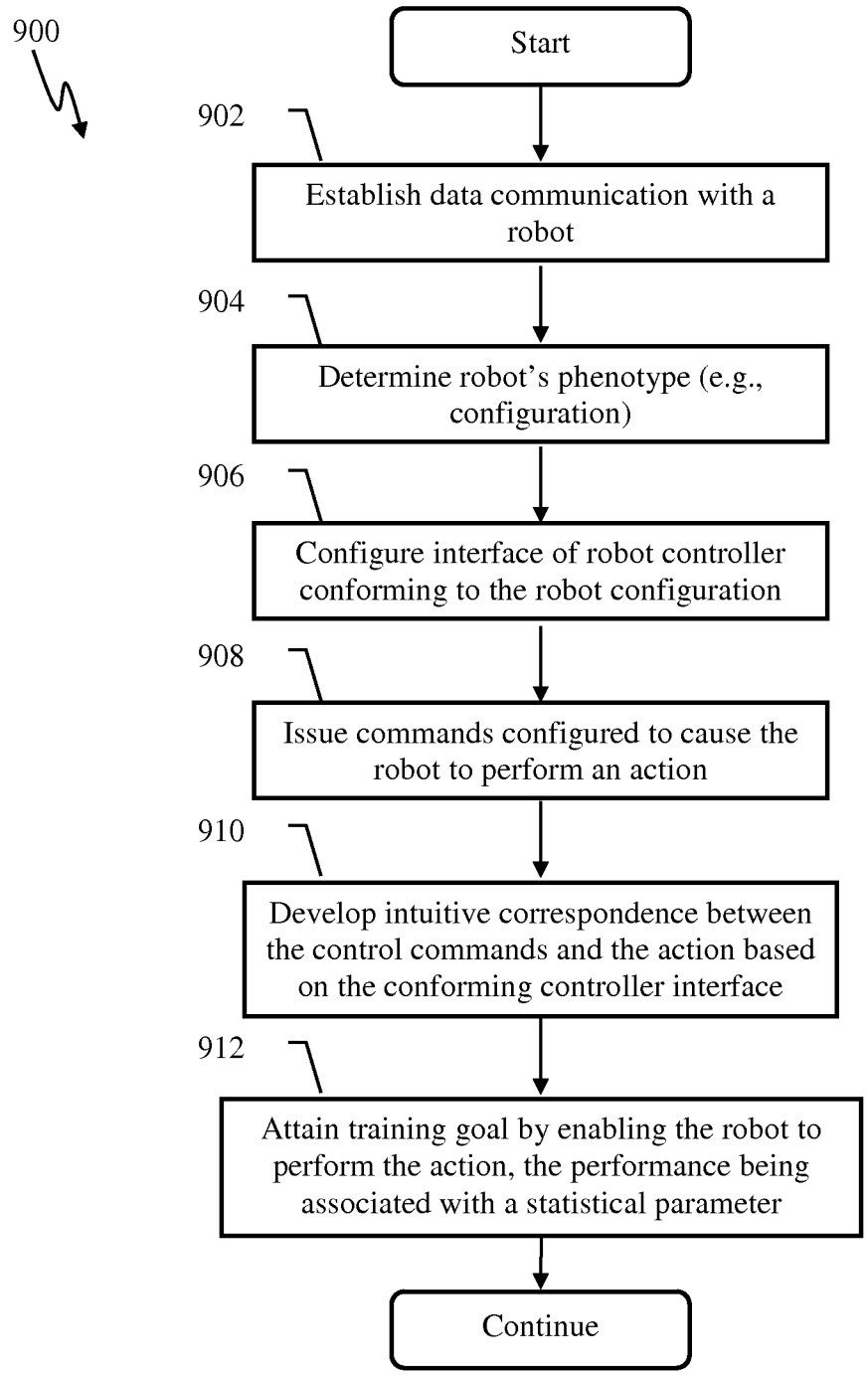
FIG. 9 is a logical flow diagram illustrating a method of training a robotic apparatus using an adaptive remoter controller apparatus, in accordance with one or more implementations.

FIGS. 7-9 illustrate methods of training an adaptive apparatus of the disclosure in accordance with one or more implementations. The operations of methods 700, 800, 820, 900 presented below are intended to be illustrative. In some implementations, methods 700, 800, 820, 900 may be accomplished with one or more additional operations not described, and/or without one or more of the operations discussed. Additionally, the order in which the operations of methods 700, 800, 820, 900 are illustrated in FIGS. 7-9 described below is not intended to be limiting.

In some implementations, methods 700, 800, 820, 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 800, 820, 900 in response to instructions stored electronically on an electronic storage medium. The one or more processing devices may include one or more devices configured through hardware, firmware, and/or software to be specifically designed for execution of one or more of the operations of methods 700, 800, 820, 900. Operations of methods 700, 800, 820, 900 may be utilized with a remote controlled robotic apparatus such as illustrated in FIGS. 2B-6.

At operation 702 of method 700, illustrated in FIG. 7, a configuration of the robotic apparatus may be determined. The configuration may comprise robot hardware components (e.g., number of joints, number of motor actuators, orientation of joints and/or motor actuators, and/or other information associated with a configuration) and or operational parameters (e.g., orientation of robotic platform and/or other operational parameters). In one or more implementations, the configuration may be may be polled (e.g., requested) by, for example, using a remote controller apparatus and/or a computerized server, described above with respect to FIG. 6. In some implementations, the configuration may be provided or pushed by the robot. In one or more implementations, the configuration may be provided by a user based on visual inspection and/or a documentation review. The configuration may be loaded from a data depository (e.g., based on robot's serial number).

At operation 704, the configuration may be communicated to the adaptation logic associated with remote control interface. In some implementations, the adaptation logic may comprise a processor of the remoter controller (e.g., 266 in FIG. 2A). In one or more implementations, the adaptation logic may be embodied in a cloud server (e.g., 610 in FIG. 6).

At operation 706, a configuration of a remote controller interface that is consistent with the robot configuration may be determined. In one or more implementations, the consistent interface configuration may be based on disposing one or more control elements (e.g., sliders 542, 544 in FIG. 5B) aligned with axes of respective motion components of the robot. In some implementations, the compliant remote interface structure may be communicated by a remote logic (e.g., server 610) to the remote controller.

At operation 708, the robot may be operated using a remote controller characterized by the consistent interface configuration.

FIG. 8 illustrates a method of adapting remote controller of a robot based on a change of robot configuration, in accordance with one or more implementations.

At operation 802 interface of controller of a robot may be arranged in accordance with robot hardware configuration. In some implementations, the robot hardware configuration may comprise one or more of a number of joints, a number of motor actuators, orientation of joints and/or motor actuators, and/or other information associated with configuration. Arrangement of the remote control interface may comprise disposing control element (e.g., sliders 302, 304 in FIG. 3) parallel to the respective motion components (e.g., 232, 234 of FIG. 2C).

At operation 804, the robot may be operated using the interface configuration determined at operation 802. In some implementations, operations 804 may comprise controlling speed and direction of the rover 220 of FIG. 2C using sliders 302, 304 and/or the slider 302 and the knob 324 of FIG. 3, and/or controlling the robotic apparatus 400 of FIG. 4A using control elements shown and described with respect to FIGS. 4B-4C above.

At operation 806, a modification of the robot hardware configuration may be detected. In some implementations, the modification of the robot hardware configuration may comprise addition and/or removal of joints and/or motor actuators, change of orientation of joints and/or motor actuators, coupling and/or decoupling or paired wheels, and/or other changes or modifications. In one or more implementations, the modification of the robot hardware configuration may be performed by a user. The modification of the robot hardware configuration may occur due to a component malfunction (e.g., burned out motor). The detection may be performed automatically based on a configurations file and/or execution of a diagnostic process by hardware component controller (e.g., servo error status report). In some implementations, the modification detection information may be provided by a user (e.g., via changes to a configuration register). In one implementations, the modification may comprise conversion of fixed front wheel vehicle (e.g., the rover 200 of FIG. 2B) to a vehicle comprising articulated front wheels (e.g., 220 in FIG. 2C).

At operation 808, an interface of the robotic controller may be adjusted consistent with the modified robot configuration as described, for example, with respect to operation 802 above.

At operation 810, the robot may be operated using the adjusted interface configuration determined at operation 808. In some implementations, operations 810 may comprise controlling speed and direction of the rover 220 of FIG. 2C using sliders 302, 304 and/or the slider 302 and the knob 324 of FIG. 3 and/or controlling the robotic apparatus 400 of FIG. 4A using control elements 452, 458, 462, 464 shown in FIG. 4B and/or control elements 478, 482 shown in FIG. 4C.

FIG. 8B is a logical flow diagram illustrating a method of adapting a remote controller of a robot based on a change of operating environment and operational parameters of a robot, in accordance with one or more implementations.

At operation 822, an interface of a controller of a robot may be arranged in accordance with a robot hardware configuration. In some implementations, the robot hardware configuration may comprise one or more of a number of joints, a number of motor actuators, orientation of joints and/or actuators, and/or other information associated with configuration.

At operation 824, the robot may be operated using the interface configuration determined at operation 822. In some implementations, operations 824 may comprise controlling speed and/or direction of the rover 220 of FIG. 2C using sliders 302, 304 and/or the slider 302 and the knob 324 of FIG. 3 and/or controlling the robotic apparatus 400 of FIG. 4A using control elements 452, 458, 462, 464 shown in FIG. 4B and/or control elements 478, 482 shown in FIG. 4C.

At operation 826, changes of the robot operational configuration and/or environment characteristics may be detected. In some implementations, changes of the robot operational configuration may be based on a change of robot orientation (e.g. as described with respect to FIGS. 5A-5B). In or more implementations, changes of the environment characteristics may comprise one or more of physical load of the robot, wind and/or other external forces that may be acting upon the robot, energy level and/or power draw of the robot, terrain characteristics (e.g., smoothness and/or roughness), type and weight of cargo, and/or other parameters. By way of a non-limiting illustration, responsive to carrying delicate objects, speed may be reduced and/or movement control precision may be increased. The user interface controls may be adapted to provide increased precision control functionality. Increasing precision control functionality may include providing coarse/fine movement controls. Responsive to operating in the presence of external forces (e.g., wind, currents, and/or slope), the control configured to control movement in the direction of the external force (e.g., along river) may be adapted to provide extra acceleration when applied in a direction against the force (e.g., against current) and/or reduced acceleration when applied in a direction coinciding with the external force (e.g., with the current). The configuration and/or presentation of the controls (e.g., their orientation and/or size) may be altered by the presence of these and/or other external forces.

In some implementations, the modification detection information may be provided by a user (e.g., via changes to a configuration register and/or a command) and/or detected automatically based, for example, on an output of robot's orientation sensor.

At operation 828, interface of the robotic controller may be adjusted consistent with the modified robot configuration as described, for example, with respect to operation 802 of FIG. 8A above.

At operation 830, the robot may be operated using the adjusted interface configuration determined at operation 828. In some implementations, operations 830 may comprise controlling speed and direction of the rover 220 of FIG. 2C using sliders 302, 304 and/or the slider 302 and the knob 324 of FIG. 3 and/or controlling the robotic apparatus 400 of FIG. 4A using control elements 452, 458, 462, 464 shown in FIG. 4B and/or control elements 478, 482 shown in FIG. 4C.

FIG. 9 is a logical flow diagram illustrating a method of training a robotic apparatus using an adaptive remoter controller apparatus, in accordance with one or more implementations. Operations of method 900 may be utilized in training a robot to perform an action such as, for example, following a target trajectory.

At operation 902, a data communication may be established with a robot. In some implementations, the communication may comprise communication between the robot and a robot remote controller (e.g., 604 in FIG. 6) via wired and/or wireless link.

At operation 904, a robot configuration may be determined. In some implementations, determination of the robot's configuration may comprise operation 702 of method 700 of FIG. 7 described above.

At operation 906, an interface of a robot controller may be configured to conform to the robot configuration. In some implementations, the robot configuration may be characterized by a number of joints, a number of motor actuators, orientation of joints and/or motor actuators, and/or other information associated with configuration. Arrangement of the remote control interface may comprise disposing control element (e.g., sliders 302, 304 in FIG. 3) parallel to the respective motion components (e.g., 232, 234 of FIG. 2C).

At operation 908, training may commence. A training goal may comprise directing the robot to follow a target trajectory.

During training, at operation 910, intuitive correspondence may be developed between the control commands and the resultant action by the robot. The development of the intuitive correspondence may be facilitated based on the conforming configuration of the controller interface obtained at operations 906. By way of non-limiting illustration, using controller interface wherein motion of control elements (e.g., the sliders 302, 304 in FIG. 3) matches orientation of robot movements (e.g., motion components denoted by arrows 232, 234 of FIG. 2C) may enable user to provide more timely training input, reduce number of erroneous commands due to, e.g., user confusion.

At operation 912, the training goal may be attained. In some implementations, the goal attainment may be determined based on the robot navigating the target directory with target performance. In one or more implementations, training performance may be determined based on a discrepancy measure between the actual robot trajectory and the target trajectory. The discrepancy measure may comprise one or more of maximum deviation, maximum absolute deviation, average absolute deviation, mean absolute deviation, mean difference, root mean squared error, cumulative deviation, and/or other measures.

One or more of the methodologies comprising adaptation of remote control user interface described herein may facilitate training and/or operation of robotic devices. In some implementations, a user interface configured to match configuration of the robot may enable users to provide more timely training input, reduce number of erroneous commands due to, e.g., user confusion. Such development of intuitive correspondence between the controller interface and the robot behaved (e.g., movements) improvements may reduce training time and/or improve training accuracy. In some applications, adaptively configured user interface may free users from the need to re-program remote control devices for every individual robot configuration thereby enabling a wide population of users without specialized robotic programming skills to train and operate a wider variety of robots.

In some implementations, remote interface adaptation due to detected robot component failures may improve user experience while operate robotic devices by, for example, disabling controls for failed components.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. This description is in no way meant to be limiting, but rather should be taken as illustrative of the general principles of the technology. The scope of the disclosure should be determined with reference to the claims.

What is claimed is:

1. A non-transitory machine-readable storage medium having instructions embodied thereon, the instructions being executable to perform a method for controlling a robotic apparatus, the method comprising:
   establishing a data connection to the robotic apparatus;
   receiving information related to a phenotype of the robotic apparatus; and
   issuing a command to a user interface apparatus, the user interface apparatus executing an action based on the command, the command indicative of at least one configuration associated with the information;
   wherein:
      the user interface apparatus comprises a display apparatus comprising at least one control configured to relay user input to the robotic apparatus;
      executing the action causes the user interface apparatus to alter a representation of the at least one control consistent with the information;
      the phenotype is characterized by one or both of (i) a hardware configuration of the robotic apparatus or (ii) an operational configuration of the robotic apparatus;
      the information is based on a statistical parameter related to a plurality of actions executed by the robotic apparatus responsive to a plurality of user commands relayed by the control; and
      individual ones of the plurality of actions are determined based on one or both of the hardware configuration of the robotic apparatus or the operational configuration of the robotic apparatus.

2. The non-transitory machine-readable storage medium of claim 1, wherein the command is configured to be issued automatically absent an explicit request by the user.

3. The non-transitory machine-readable storage medium of claim 1, wherein:
   the at least one control comprises:
      (1) a first slider configured to relate forward and reverse motion commands;
      (2) a second slider configured to relate left and right turn commands; and
      (3) reverse motion commands; and
   main axes of the first slider and the second slider are disposed perpendicular with one another.

4. The non-transitory machine-readable storage medium of claim 1, wherein:
   the phenotype is characterized by one or both of (i) a hardware configuration of the robotic device or (ii) operational configuration of the robotic device; and
   the information is configured to relate modification of one or both of the hardware configuration or the operational configuration of the robotic device.

5. The non-transitory machine-readable storage medium of claim 4, wherein the hardware configuration of the robotic device comprises one or more of a number of motor actuators, a rotation axis orientation for individual actuators, or a number of actuators configured to be activated simultaneously.

6. The non-transitory machine-readable storage medium of claim 4, wherein the operational configuration of the robotic device comprises one or more of a number of motor actuators, a rotation axis orientation for individual actuators, or a number of actuators configured to be activated simultaneously.

7. The non-transitory machine-readable storage medium of claim 1, wherein:
   the phenotype is characterized by a hardware configuration of the robotic apparatus;
   the information is based on a statistical parameter related to a plurality of actions executed by the robotic apparatus responsive to a plurality of user commands relayed by the control; and
   individual ones of the plurality of actions configured based on at least one of the hardware configuration of the robotic apparatus.

8. The non-transitory machine-readable storage medium of claim 7, wherein altering of the representation of the at least one control consistent with the information comprises rendering the control on the display apparatus consistent with the hardware configuration.

9. The non-transitory machine-readable storage medium of claim 8, wherein:
   the robotic apparatus comprises one or both of a wheel or a joint, characterized by axis of rotation;
   the hardware configuration is configured to convey placement of the axis with respect to a reference direction; and
   the altering of the representation of the at least one control consistent with the information comprises disposing the control on the display apparatus at an orientation matching the placement of the axis with respect to the reference direction.

10. The non-transitory machine-readable storage medium of claim 9, wherein the reference direction comprises orientation of one of display dimensions.

11. The non-transitory machine-readable storage medium of claim 8, wherein the user interface apparatus comprises one or more of touch-sensing interface, a contactless motion sensing interface, or a radio frequency wireless interface.

12. The non-transitory machine-readable storage medium of claim 1, wherein:
   the robotic apparatus comprises a humanoid robot comprising (1) a first joint configured to be rotated with respect to a first axis and (2) a second joint configured to be rotated with respect to a second axis, a non-zero angle existing between the first axis and the second axis; and
   the altering of the representation of the at least one control is configured to dispose a first control element and a second control element adapted to control the first joint and the second joint, respectively, at the non-zero angle.

13. A non-transitory machine-readable storage medium having instructions embodied thereon, the instructions being executable to perform a method for controlling a robotic device, the method comprising:
   establishing a data connection to the robotic device;
   receiving information related to a phenotype of the robotic device; and
   issuing a command to a user interface apparatus, the user interface apparatus executing an action based on the command, the command indicative of at least one configuration associated with the information;
   wherein:
      the user interface apparatus comprises a display apparatus comprising at least one control configured to relay user input to the robotic device;

executing the action causes the user interface apparatus to alter a representation of the at least one control consistent with the information;

the robotic device comprises at least one actuator characterized by an axis of motion; and the information is configured to relate an orientation of the axis of motion with respect to a reference orientation.

14. The non-transitory machine-readable storage medium of claim 13, wherein:

the reference orientation comprises a geographical coordinate; and the information comprises a computer design file of the robotic device, the computer design file comprising a description of the actuator and the axis of motion.

15. The non-transitory machine-readable storage medium of claim 13, wherein:

the reference orientation comprises an axis of the robotic device;

the display apparatus is characterized by a default orientation; and altering the representation of the at least one control consistent with the information comprises:

determining an angle between the reference orientation and the axis of motion; and positioning the at least one control on the display apparatus at the angle relative the default orientation.

16. The non-transitory machine-readable storage medium of claim 15, wherein:

the phenotype is characterized by a hardware configuration of the robotic device, the hardware configuration comprising information related to one or more of the actuator and the axis of the robotic device;

the information is based on a statistical parameter related to a plurality of actions executed by the robotic device responsive to a plurality of user commands relayed by the control; and individual ones of the plurality of actions configured based on at least one of the hardware configuration of the robotic device.

17. The non-transitory machine-readable storage medium of claim 16, wherein the command is configured to be issued automatically absent an explicit request by the user.

18. The non-transitory machine-readable storage medium of claim 17, wherein altering of the representation of the at least one control consistent with the information comprises rendering the control on the display apparatus consistent with the hardware configuration.

19. The non-transitory machine-readable storage medium of claim 13, wherein the reference direction comprises orientation of one of display dimensions.

20. A non-transitory machine-readable storage medium having instructions embodied thereon, the instructions being executable to perform a method for controlling a robotic device, the method comprising:

establishing a data connection to the robotic device;

receiving information related to a phenotype of the robotic device; and issuing a command to a user interface apparatus, the user interface apparatus executing an action based on the command, the command indicative of at least one configuration associated with the information;

wherein:

the user interface apparatus comprises a display apparatus comprising at least one control configured to relay user input to the robotic device;

executing the action causes the user interface apparatus to alter a representation of the at least one control consistent with the information;

the robotic device comprises first and second actuators configured to displace at least a portion of the robotic device in a first direction and a second direction, respectively;

the information comprises parameters of the first direction and the second direction;

the at least one control comprises a first translational motion control and a second translational motion control associated with the first actuator and the second actuator, respectively; and the act of altering the representation of the at least one control consistent with the information comprises:

positioning the first translational motion control at the first direction; and positioning the second translational motion control at the second direction, the second direction being perpendicular to the first direction.

21. The non-transitory machine-readable storage medium of claim 20, wherein:

the robotic device is characterized by a default orientation; and the first direction and the second direction comprise a direction of longitudinal and transverse motions relative to the default orientation.

22. An apparatus configured to control a robotic device, the apparatus comprising:

a non-transitory machine-readable storage medium having machine-readable instructions embodied thereon; and one or more physical processors configured by the machine-readable instructions to:

establish a data connection to the robotic device;

receive information related to a phenotype of the robotic device; and issue a command to a user interface apparatus, the user interface apparatus executing an action based on the command, the command indicative of at least one configuration associated with the information;

wherein:

the user interface apparatus comprises a display apparatus comprising at least one control configured to relay user input to the robotic device;

executing the action causes the user interface apparatus to alter a representation of the at least one control consistent with the information;

the robotic device is characterized by a default orientation;

the robotic device comprises first actuator configured to rotate at least a portion of the robotic device about a first axis configured vertically with respect to the default orientation;

the second actuator is configured to move the robotic device in a longitudinal direction relative the default orientation; and the act of altering the representation of the at least one control consistent with the information comprises:

providing a rotational control element configured to receive an indication related to rotation of the least a portion of the robotic device about the first axis disposed vertically with respect to the default orientation, an axis of the rotational control element being disposed parallel to the first axis; and providing a longitudinal control element configured to receive an indication related to displacement of the robotic device along the longitudinal direction, an axis of the longitudinal control element being disposed parallel to the longitudinal direction.

23. The apparatus of claim 22, wherein the rotational control element comprises a knob having an axis of rotation configured such that there is a match between (1) a mutual orientation of the axis of rotation and the longitudinal direction and (2) a mutual orientation of the axis of rotation and the default orientation of the robotic device.

24. The apparatus of claim 22, wherein:
the phenotype is characterized by one or both of (i) a hardware configuration of the robotic device—or (ii) an operational configuration of the robotic device;
the information is based on a statistical parameter related to a plurality of actions executed by the robotic device responsive to a plurality of user commands relayed by the control; and
altering of the representation of the at least one control consistent with the information comprises rendering the control on the display apparatus consistent with the hardware configuration.

25. The apparatus of claim 24, wherein:
the robotic device comprises one or both of a wheel or a joint, characterized by axis of rotation;
the hardware configuration is configured to convey placement of the axis of rotation with respect to a reference direction; and
the altering of the representation of the at least one control consistent with the information comprises disposing the control on the display apparatus at an orientation matching the placement of the axis of rotation with respect to the reference direction.

26. The apparatus of claim 24, wherein the user interface apparatus comprises one or more of touch-sensing interface, a contactless motion sensing interface, or a radio frequency wireless interface.

* * * * *